June 9, 1925.
C. P. DUBBS
APPARATUS FOR DISTILLING LIQUIDS
Filed Aug. 12, 1920
1,541,210
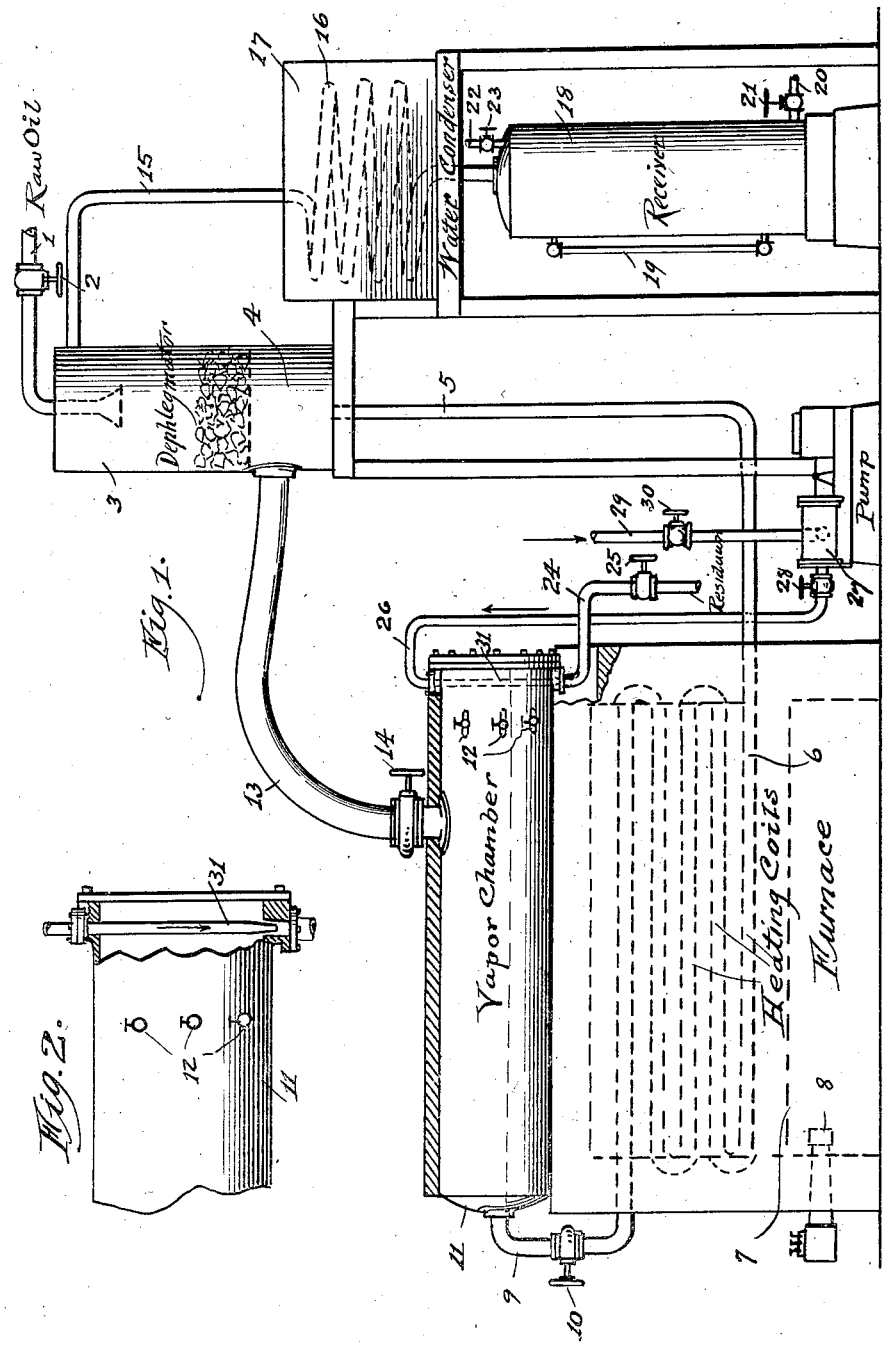

Patented June 9, 1925.

1,541,210

UNITED STATES PATENT OFFICE.

CARBON P. DUBBS, OF WILMETTE, ILLINOIS, ASSIGNOR TO UNIVERSAL OIL PRODUCTS COMPANY, OF CHICAGO, ILLINOIS, A CORPORATION OF SOUTH DAKOTA.

APPARATUS FOR DISTILLING LIQUIDS.

Application filed August 12, 1920. Serial No. 403,077.

*To all whom it may concern:*

Be it known that I, CARBON P. DUBBS, a citizen of the United States, residing in the city of Wilmette, county of Cook, and State of Illinois, have invented certain new and useful Improvements in Apparatus for Distilling Liquids, of which the following is a specification.

This invention relates to improvements in an apparatus for distilling liquids and refers more particularly to one which may be operated continuously, although there is a substantial deposition of foreign matter in the reacting zone during distillation.

Among its salient objects are to provide an apparatus, particularly adapted to the continuous distillation of hydrocarbon oils, one in which the precipitated carbon which collects during distillation is prevented from collecting in the reacting or vapor chamber due to the provision made for flushing the residuum drawoff line; to provide an arrangement of the apparatus which is adaptable to any type of still where distillation takes place in one or more chambers or reacting zones in which the oil vapors are released from the oil body and the heavier residuum, together with the precipitate collects in the bottom thereof; to provide an apparatus which is cheap of construction and positive in operation and in general to provide an apparatus of the character referred to.

In the drawings:

Fig. 1 is a diagrammatic side elevation of the oil apparatus.

Fig. 2 is a detail view of the residuum drawoff flushing arrangement.

Referring in detail to the drawings, the raw oil is introduced through the pipe 1, controlled by a valve 2 to the dephlegmator 3, which is filled with comminuted material for the purpose of finely dividing the incoming oil and exposing a greater surface for the oil vapors which pass in opposed directions to the raw oil in the dephlegmator. The oil charge with what condensate content it may collect accumulates in a pool 4, in the lower portion of the dephlegmator and is drawn off through the pipe 5, which directs it to the heating coils 6, which are mounted in the furnace 7 and are preferably heated by means of gas burners 8. The cracked oil from the heating coils passes up through the line 9 regulated by a throttle valve 10, and is introduced to the vapor chamber 11, in which the oil vapor is released and the heavier residual material, together with the precipitated carbon collects in the bottom thereof. Gauge cocks 12 are tapped into the side of the vapor chamber for ascertaining the height of the oil therein. The oil vapors released from the oil body pass out to the vapor line 13, in which is interposed a throttle valve 14 and are dephlegmated as previously explained in the dephlegmator 3. The vapors which are not condensed in the dephlegmator pass out through the top through the line 15 to the coil 16 mounted in water condenser 17. The liquid condensate from the water condenser is collected in the receiver 18, which is fitted with a liquid gauge 19, a drawoff line 20, regulated by a valve 21 and a pressure relief pipe 22, controlled by a valve 23.

A residuum drawoff line 24, controlled by a valve 25, is tapped into the bottom of the vapor chamber. Into the top of the chamber is introduced a line 26, which is connected to a pump 27, and has interposed in it a valve 28. The pump 27 draws its supply of liquid through the inlet line 29, regulated by a valve 30, and forces the same through the line 26 into the top of the vapor chamber and thence down through an injector nozzle 31, which extends into the chamber and projects slightly into the residuum drawoff. In this manner, an oil either heated or otherwise, of a light gravity and carbon free, may be injected directly into the residuum drawoff line and flush out any foreign substance such as precipitated carbon which may collect in this line.

It is a frequent occurrence during the operation of an oil cracking still or other type of distilling apparatus in which vapors are released from the body of the liquid, for a precipitate to form in the vapor chamber, so that the drawoff line will be caked with this precipitated substance and oftentimes clog so that the process will have to be shut down in order that the apparatus may again be put in working condition. Such shutdowns are troublesome and involve considerable expense, where large amounts of oil or other liquid substances are used and where considerable heat is required to raise the liquid to desired temperatures.

By means of this simple apparatus which is adaptable to any type of still or distilling apparatus, this drawoff line from the vapor chamber may be kept flushed clean at all times and in this manner, materially extend the period during which the apparatus may be operated.

I claim as my invention:

1. In an apparatus for distilling liquids, the combination with a heating means, of a vapor chamber and condensing means connected therewith, a residuum drawoff line for removing residual substances from the vapor chamber, means for preventing clogging of the residual substances in the residuum drawoff line comprising an injector nozzle disposed within the vapor chamber for discharging oil into the entrance of the residuum drawoff line.

2. In an apparatus for distilling hydrocarbon oils, the combination with a heating means where the oil is heated to a vaporizing temperature, of a vapor chamber in communication therewith, a vapor discharge line from said chamber, a residual discharge leading therefrom, and an injector nozzle disposed within said chamber and terminating at the entrance of the residual discharge, and means for feeding liquid oil through said nozzle to maintain the discharge from the vapor chamber free of residual carbon.

CARBON P. DUBBS.